(12) United States Patent
Lee et al.

(10) Patent No.: US 8,983,514 B2
(45) Date of Patent: Mar. 17, 2015

(54) METHOD AND DEVICE FOR TRANSMITTING AND RECEIVING AVAILABLE CHANNEL INFORMATION WITHIN WHITE SPACE BAND

(75) Inventors: Jihyun Lee, Gyeonggi-do (KR); Eunsun Kim, Gyeonggi-do (KR); Yongho Seok, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 216 days.

(21) Appl. No.: 13/814,997

(22) PCT Filed: Aug. 10, 2011

(86) PCT No.: PCT/KR2011/005838
§ 371 (c)(1),
(2), (4) Date: Feb. 14, 2013

(87) PCT Pub. No.: WO2012/020982
PCT Pub. Date: Feb. 16, 2012

(65) Prior Publication Data
US 2013/0143613 A1  Jun. 6, 2013

Related U.S. Application Data

(60) Provisional application No. 61/372,456, filed on Aug. 10, 2010.

(51) Int. Cl.
*H04B 7/00* (2006.01)
*H04W 72/04* (2009.01)
(Continued)

(52) U.S. Cl.
CPC ............ *H04W 72/044* (2013.01); *H04W 16/14* (2013.01); *H04W 28/06* (2013.01); *H04W 48/08* (2013.01); *H04W 48/16* (2013.01); *H04W 72/00* (2013.01); *H04W 84/12* (2013.01)
USPC ........... 455/509; 455/511; 455/512; 455/450; 455/515; 455/517; 370/328; 370/329; 370/338; 370/343

(58) Field of Classification Search
CPC ...... H04W 72/04; H04W 16/14; H04W 84/12
USPC ......... 455/509, 511, 512, 515, 507, 500, 517, 455/450, 451, 452.1, 452.2, 422.1, 403, 455/412.1, 412.2, 67.11, 414.1–414.4, 455/426.1, 426.2, 454, 455, 516, 550.1; 370/328, 329, 338, 343
See application file for complete search history.

(56) References Cited

U.S. PATENT DOCUMENTS

2009/0268674 A1  10/2009  Liu et al.
2010/0182928 A1  7/2010  Wu et al.
(Continued)

FOREIGN PATENT DOCUMENTS

KR  10-2009-0030453 A  3/2009

OTHER PUBLICATIONS

International Search Report issued in corresponding International Application No. PCT/KR2011/005838 dated Feb. 6, 2012.

*Primary Examiner* — Keith Ferguson
(74) *Attorney, Agent, or Firm* — Morgan, Lewis & Bockius LLP

(57) ABSTRACT

The present invention relates to a method for a first station (STA) comprising: obtaining available channel information by accessing a database that manages the available channel information within the white space band, and transmitting a white space map (WSM) generated according to the available channel information to a second STA, the WSM includes a channel map field having a variable length, a length field including the length of the channel map field, and map ID information indicating a type of the WSM and whether the WSM being updated; and if the available channel information obtained from the DB indicates that no available channel exists within the white space band, a map ID is set to indicate that the WSM is the updated WSM, and the first STA transmits the WSM which is set as the length field to indicate that the length of the channel map field is 0.

12 Claims, 5 Drawing Sheets

(51) Int. Cl.
*H04W 48/08* (2009.01)
*H04W 16/14* (2009.01)
*H04W 28/06* (2009.01)
*H04W 48/16* (2009.01)
*H04W 72/00* (2009.01)
*H04W 84/12* (2009.01)

(56) References Cited

U.S. PATENT DOCUMENTS

2010/0195580 A1 8/2010 Samarasooriya et al.
2010/0195590 A1 8/2010 Park
2011/0116458 A1* 5/2011 Hsu et al. ..................... 370/329

* cited by examiner

METHOD AND DEVICE FOR TRANSMITTING AND RECEIVING AVAILABLE CHANNEL INFORMATION WITHIN WHITE SPACE BAND

This is a U.S. National Phase Entry of PCT Application No. PCT/KR2011/005838, filed Aug. 10, 2011, and claims the benefit of U.S. Provisional Application No. 61/372,456 filed Aug. 10, 2010.

TECHNICAL FIELD

The present invention relates to transmission and reception of available channel information within a white space band, and more particularly, to a method and device for performing a wireless local area network (WLAN) operation by performing efficiently performing signaling between stations if there is no available channel within a white space band.

BACKGROUND ART

The IEEE 802.11 WLAN standard provides a transmission rate of 11 Mbps (IEEE 802.11b) and 54 Mbps (IEEE 802.11a) based on an unlicensed band at 2.4 GHz or 5 GHz. In more detail, the IEEE 802.11g provides a transmission rate of 54 Mbps by using orthogonal frequency division multiplexing (OFDM) at 2.4 GHz, and the IEEE 802.11n provides a transmission rate of 300 Mbps for four spatial streams by using multiple input multiple output-OFDM (MIMO-OFDM). The IEEE 802.11n supports a channel bandwidth of 40 MHz, and in this case, provides a transmission rate of 600 Mbps.

A TV white space includes a very high frequency (VHF) band (54~72 MHz, 76~88 MHz, 174~216 MHz) and an ultra high frequency (UHF) band (470~698 MHz) which are allocated to a broadcast TV, and means a frequency band where use of an unlicensed device is allowed on the condition that communication of a licensed device (TV broadcasting and radio mike, etc.) operating at the corresponding frequency band is not interrupted.

However, in the following description, the TV white space is only an example of a white space, and the white space may refer to a TV white space and a random band/communication zone where an unlicensed device may be operated while protecting a licensed device.

An unlicensed device which desires to use the aforementioned white space should provide a protection function for a licensed device. Accordingly, the unlicensed device should necessarily check whether the licensed device occupies a white space band, before starting to transmit a signal at the white space band (for example, TV band). To this end, it is preferable that the unlicensed device acquires available channel list information at a corresponding zone by accessing a geo-location database through Internet or dedicated network. In this case, the geo-location database means a database that stores and manages information of a licensed device registered therewith and channel use information varied dynamically depending on geo-location and use time of licensed devices.

Also, a station (hereinafter, referred to as "STA") for operating at a white space may perform spectrum sensing mechanism. Examples of the spectrum sensing mechanism may include an energy detection mechanism and a feature detection mechanism. In other words, as a spectrum sensing result of the STA, if strength of a received signal at a corresponding frequency is more than a given value, it may be determined that the corresponding frequency is used by the licensed device (or incumbent user), or if a DTV preamble is detected in case of a TV white space, it may be determined that the incumbent user is using a corresponding channel.

And, if it is determined that the incumbent user is using a channel directly adjoining a channel currently in service, the STA needs to lower a transmission power.

DISCLOSURE

Technical Problem

As described above, in order that the STA operates at a white space band, it is required that available channel information within a corresponding white space band should be acquired. In this respect, an object of the present invention is to provide a method for efficiently transmitting and receiving available channel information within a white space band.

In particular, another object of the present invention is to provide a mechanism that shares available channel information by minimizing signaling overhead without confusion between STAs if there is no available channel within a white space band, and a device for performing the mechanism.

Technical Solution

To achieve the aforementioned objects, according to one aspect of the present invention, a method for allowing a first station (STA) to transmit available channel information for a wireless local area network (WLAN) operation within a white space band comprises the steps of acquiring the available channel information by accessing a database (DB) that manages the available channel information within the white space band; and transmitting a white space map (WSM) generated in accordance with the available channel information to a second STA, wherein the WSM includes a channel map field having a variable length, a length field indicating a length of the channel map field, and map ID information indicating a type of the WSM and indicating whether the WSM has been updated, and if the available channel information acquired from the DB indicates that there is no available channel within the white space band, the first STA sets the map ID to indicate that the WSM is the updated WSM and transmits WSM which is set to allow the length field to indicate that the length of the channel map field is 0.

In this case, the map ID field may include a map type field indicating that the WSM indicates partial available channel information or full available channel information, and a map version field indicating whether the WSM has been updated. If the available channel information acquired from the DB indicates that there is no available channel within the white space band, the first STA may increase a value of the map version as much as 1 on the basis of modulo operation within the range of a predetermined integer, and transmit WSM which is set to allow the length field to indicate that the length of the channel map field is 0.

Also, if the available channel information acquired from the DB is not changed from available channel information acquired during previous access, the first STA may maintain the value of the map version and transmit WSM which is set to allow the length field to indicate that the length of the channel map field is 0.

If the available channel information acquired from the DB is not changed from available channel information acquired during previous access, the first STA may transmit WSM which is set to allow the map type field to indicate that the WSM indicates full available channel information.

In another aspect of the present invention, a method for allowing a second station (STA) to receive available channel information for a wireless local area network (WLAN) operation within a white space band from a first station comprises the steps of receiving a white space map (WSM) generated in accordance with the available channel information within the white space band from the first STA; and performing WLAN operation in accordance with the received WSM, wherein the WSM includes a channel map field having a variable length, a length field indicating a length of the channel map field, and map ID information indicating a type of the WSM and indicating whether the WSM has been updated, and if the map ID indicates that the WSM is the updated WSM and the length field indicates that the length of the channel map field is 0, the second STA determines whether the available channel information within the white space band indicates that there is no available channel within the white space band, and performs the WLAN operation.

In this case, the map ID field may include a map type field indicating that the WSM indicates partial available channel information or full available channel information, and a map version field indicating whether the WSM has been updated. If the value of the map version is increased as much as 1 on the basis of modulo operation within the range of a predetermined integer and WSM indicating that the length field is 0 is received, the second STA may determine that there is no available channel within the white space band, and may perform the WLAN operation.

Also, if the value of the map version is not changed and WSM indicating that the length of the channel map field is 0 is received, the second STA may determine that there is no change in the available channel within the white space band, and may perform the WLAN operation.

The second STA may be a dependent AP, and the method may further comprise the steps of transmitting the received WSM to a third STA that receives a service from the dependent AP, if the dependent AP determines that the received WSM indicates that there is no available channel within the white space band, and changing a state of the dependent AP to an unenabled state.

In still another aspect of the present invention, a first station for transmitting available channel information for a wireless local area network (WLAN) operation within a white space band comprises a transceiver acquiring the available channel information by accessing a database (DB) that manages the available channel information within the white space band, and transmitting a white space map (WSM) generated in accordance with the available channel information to a second STA; and a processor connected with the transceiver, generating the WSM in accordance with the available channel information acquired by the transceiver, wherein the WSM includes a channel map field having a variable length, a length field indicating a length of the channel map field, and map ID information indicating a type of the WSM and indicating whether the WSM has been updated, and if the available channel information acquired from the DB indicates that there is no available channel within the white space band, the processor sets the map ID to indicate that the WSM is the updated WSM and sets the length field to indicate that the length of the channel map field is 0.

In further still another aspect of the present invention, a second station for receiving available channel information for a wireless local area network (WLAN) operation within a white space band from a first station comprises a transceiver receiving white space map (WSM) generated in accordance with the available channel information within the white space band from the first STA; and a processor connected with the transceiver, controlling the transceiver to perform the WLAN operation in accordance with the received WSM, wherein the WSM includes a channel map field having a variable length, a length field indicating a length of the channel map field, and map ID information indicating a type of the WSM and indicating whether the WSM has been updated, and if the map ID indicates that the WSM is the updated WSM and the length field indicates that the length of the channel map field is 0, the processor determines whether the available channel information within the white space band indicates that there is no available channel within the white space band, and controls the transceiver to perform the WLAN operation.

Advantageous Effects

According to the embodiments of the present invention, corresponding information may be shared by minimizing signaling overhead without confusion between STAs if there is no available channel within a white space band.

BEST MODE FOR CARRYING OUT THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Figure 1:
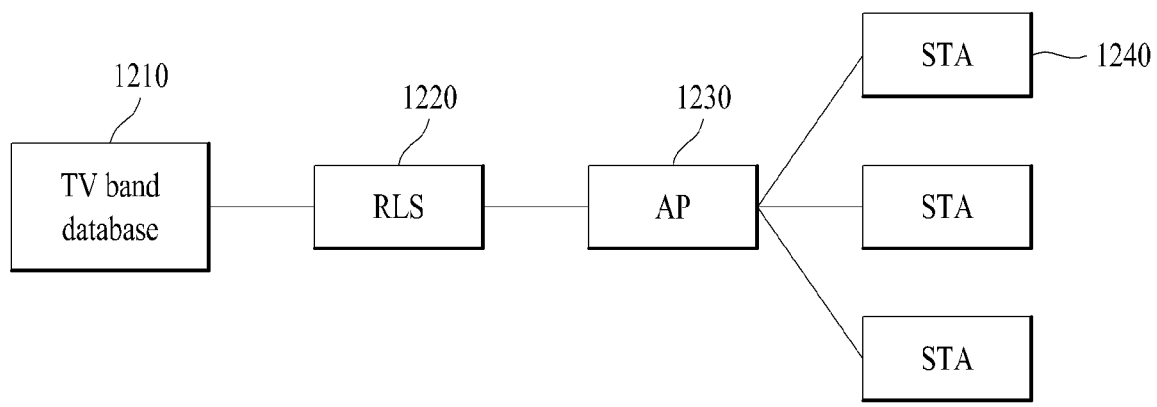
FIG. 1 is a diagram illustrating a structure of a system to which the present invention may be applied.

FIG. 1 is a diagram illustrating a structure of a system to which the present invention may be applied.

The IEEE 802.11 STA refers to an unlicensed device that operates at a white space frequency band by using an IEEE 802.11 media access control (MAC) layer and a physical (PHY) layer. Examples of STA operating at a TV white space (TVWS) frequency band may include an STA 1230 operated as an access point (AP) depending on its function and an STA 1240 to which a service is provided from the specific AP 1230.

In the embodiments of the present invention, which will be described hereinafter, it is assumed that STAs 1230 and 1240 operated as unlicensed devices at a white space use database information having available channel data depending on geolocation to acquire available channel information.

A database 1210, for example, TV band database may have information on available channels at a TV band. Generally, this database information includes location based information which is considerably detailed in the range of 50 m. A registered location server (RLS) 1220 may be a server that includes registered location information of all APs operating at a white space band. Although the white space database 1210 and the RLS 1220 are shown in FIG. 1 as separate devices, the white space database 1210 and the RLS 1220 may be implemented as one white space band database.

If the STA operating at a white space as an unlicensed device is intended to be operated at AP, the corresponding STA should register its location with the RLS 1220. In accordance with this registration, the AP 1230 may acquire available channel information of the database. Afterwards, the AP may provide the database information to the STAs 1240 belonging thereto.

In the meantime, if the unlicensed device is operated at a licensed band such as a white space, two types of STAs may be defined. The STAs may be divided into an enabling STA and a dependent STA.

The enabling STA is the STA that may enable the other dependent STA. Even though the STA does not receive an enabling signal, it may transmit a signal, and refers to STA that may initiate a network. On the other hand, the dependent STA is the STA that may transmit a signal only if it receives an enabling signal, and refers to STA that is operated under the control of the enabling STA. An example of the STA that may transmit an enabling signal may include a dependent AP STA as well as the enabling STA. The dependent STA may be enabled by the enabling STA or the dependent AP STA.

Figure 2:
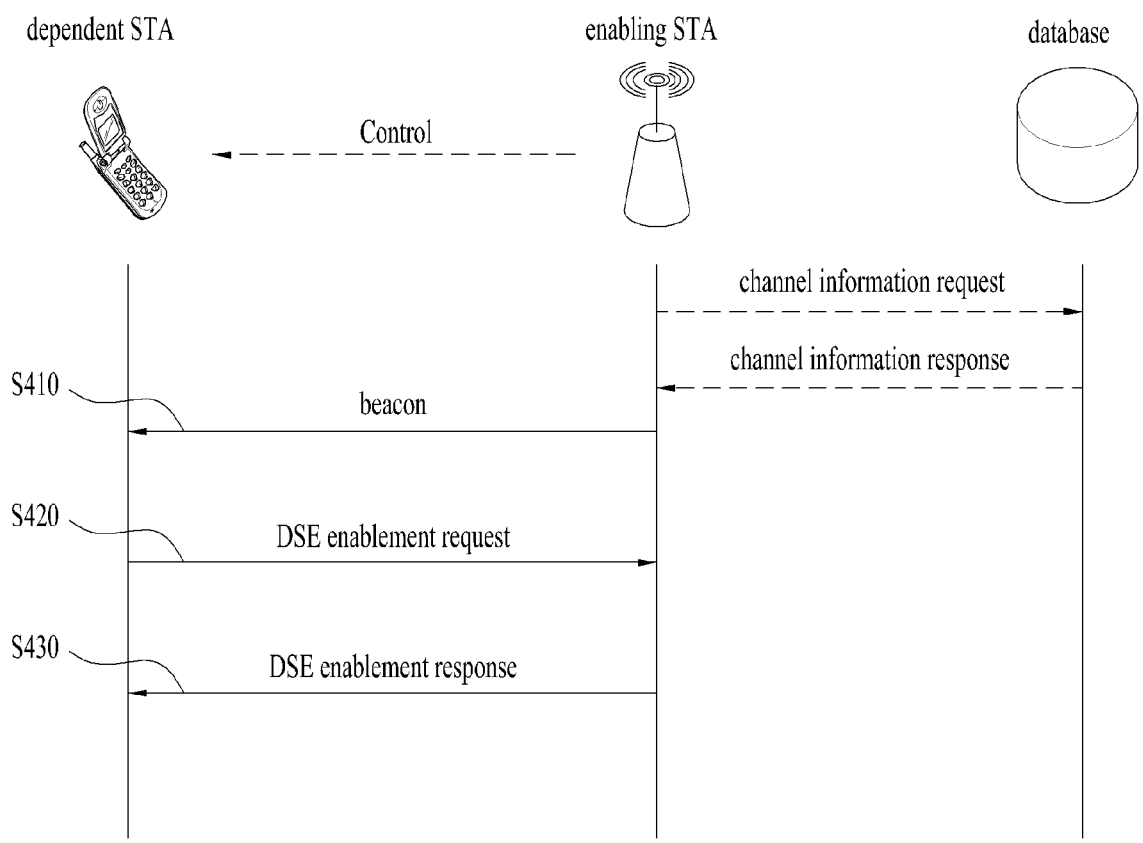
FIG. 2 is a diagram illustrating an enabling procedure of STA.

FIG. 2 is a diagram illustrating an enabling procedure of STA.

The enabling procedure of the dependent STA through the enabling STA may depend on a procedure similar to a Dynamic STA Enablement (DSE) procedure.

As shown in FIG. 2, the enabling STA may transmit a beacon, which includes an enabling signal (S310). In this case, the enabling signal may be a beacon, which includes ReLoc DSE bit of which DSE registered location element is set to 1, or a probe response message. For another example, the enabling signal may be a beacon, which includes an advertisement protocol element having an advertisement protocol tuple of which advertisement protocol ID value is set to a registered location query protocol (RLQP), or a probe response message. However, it is not required that the enabling signal is limited to a specific type. The enabling STA may transmit the DSE registered location element by being included in a probe response frame. A signal indicating that specific STA may be enabled may be an enabling signal. In the aforementioned example, the beacon or probe response frame, which includes the DSE registered location element, may be the enabling signal.

The dependent STA that receives the enabling signal and decodes the received enabling signal may transmit a DSE enablement request frame to the enabling STA (S320), and may receive a DSE enablement response frame from the enabling STA (S330). At this time, the DSE enablement response frame may include available channel information at a white space band. The dependent STA which has received the DSE enablement response message may be enabled to perform WLAN operation by using the received available channel information. In the aforementioned example, transmission of the DSE enablement request message may be performed using a channel indicated by the DSE registered location element. The DSE enablement request message may include a device identifier of STA that requests enablement. The enabling STA may determine whether to enable the corresponding dependent STA through verification of the device identifier.

In the meantime, in addition to the aforementioned enabling procedure, the STA may request another STA of available channel information periodically or depending on a specific event. The STA that has been requested available channel information may provide the available channel information in response to the request. This procedure will be referred to as a channel availability query procedure.

Hereinafter, as an example of the available channel information used as above, a white space map will be described.

A white space map (WSM) means that whether a pre-user occupies each channel of a white space band is configured in the form of a map to inform the STA of pre-user information acquired through spectrum sensing or DB access. In case of a TV white space, an available TV channel or occupied TV channel is informed in the form of a map depending on whether the TV channels are occupied by the pre-user. The STA that has received the available TV channel or the occupied TV channel may perform WLAN operation within the available WLAN channel on the basis of the received information.

The transmission of the WSM to the dependent STA is intended to reduce AP scanning overhead of the STA. In case of the TV white space, a total number of channels that should be scanned with respect to a bandwidth channel of 6 MHz at the TV band in case of the TV white space are increased as compared with a bandwidth channel of 2.4 GHz and 5 GHz (for reference, bandwidth of each channel for 2.4 GHz and 5 GHz is 20 MHz).

In other words, the enabling STA transmits information as to whether the pre-user occupies a channel and/or information as to whether the unlicensed device may use a channel, to the dependent STA. This information may be notified using the WSM. The WSM may be transmitted to the dependent STA in accordance with a management action frame, such as a beacon, probe response or white space map announcement, and a response frame to a request during the enabling procedure or after the enabling procedure is performed successfully. Although the WSM may have any kind of format, a number of an available channel should be signaled thereto. This channel number may have a unit of bandwidth of a channel occupied and used by the pre-user or a bandwidth of a channel where WLAN may be performed. Preferably, the channel number has the unit of the bandwidth of the channel used by the pre-user. For example, the WSM at the TV white space may have available channel information of a TV channel unit.

Additionally, a maximum allowable power value per channel may be indicated.

Figure 3:
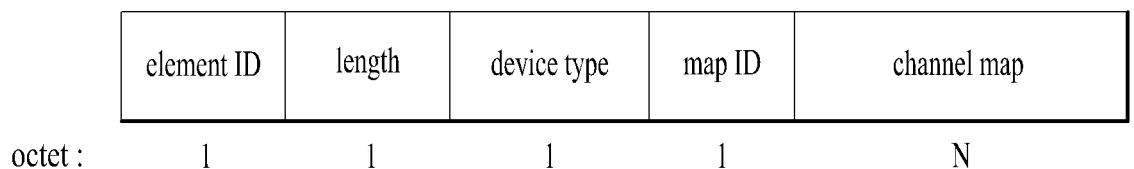
FIG. 3 is a diagram illustrating a format of WSM according to one embodiment of the present invention.

FIG. 3 is a diagram illustrating a format of WSM according to one embodiment of the present invention.

Preferably, the WSM specifies a length of a map to support a variable map length in view of the aspect that the available channel is varied depending on time and place. In FIG. 3, a length field may represent a length based on a channel map having a variable length. In more detail, the length field may be set to represent a length of WSM information field that includes a map ID field, a device type field and a channel map field having a variable length.

The device type field of the WSM represents a device type to which the WSM is applied. For example, if the value of the device type field is set to 0, it may indicate that the WSM is applied to a personal/mobile non-AP STA. If the value of the device type field is set to 1, it may indicate that the WSM is applied to a personal/mobile AP STA. And, if the value of the device type field is set to 2, it may indicate that the WSM is applied to a fixed STA. For example, if the enabling STA is a fixed device, both VHF and UHF bands may be used. If the dependent STA is a personal/mobile device, the UHF band may only be used.

Also, the WSM may have a map ID field for indicating whether the map has been updated and a type of the corresponding WSM (that is, whether the corresponding WSM is information on all available channels or partial available channels).

In FIG. 3, the channel map field may include channel numbers of available channels and maximum allowable transmission power information at the corresponding channel, and may be repeated depending on the number of available channels.

Figure 4:
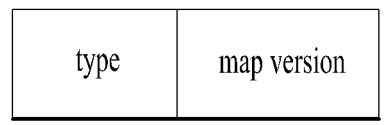
FIG. 4 is a detailed diagram illustrating a map ID field of FIG. 3.

FIG. 4 is a detailed diagram illustrating a map ID field of FIG. 3.

As shown in FIG. 4, the map ID field may include a type field indicating whether the corresponding WSM is information on all available channels or partial available channels, and a map version field indicating whether the corresponding WSM has been updated. The map version field is increased as much as 1 whenever the WSM is updated but may be set on the basis of specific integer based modulo operation.

Although the WSM may be transmitted using any transmission method, it is preferable that the WSM is transmitted to the dependent STA periodically so as not to be against responsibility for protection of the pre-user or whenever database information is updated.

The enabling STA may acquire an available channel list by accessing a database DB and notify the dependent STA of an available channel by periodically transmitting the WSM to the dependent STA. At this time, the channel map which is a list of available channels may be a list of all channels or partial channels as described above. If it is determined that available channels do not exist when the enabling STA acquires the list of available channels from the DB, or if it is determined that the available channels do not exist when sensing information of the STA, which is enabled by itself, is combined with the acquired list of the available channels, it is preferable that the enabling STA notifies the other STAs of the determined result to perform an unenabled operation.

Since the STAs have responsibility for protection of the pre-user, they may perform signal transmission at the available channel only. Accordingly, if there is no available channel, the STAs cannot perform data transmission and cannot transmit and receive a control signal required to maintain the enabling state, to and from one another.

As methods for notifying STA that there is no available channel in accordance with one embodiment of the present invention, the following methods may be provided.

A. Method for Not Transmitting WSM

According to one embodiment of the present invention, if it is identified from the list of available channels, which is acquired from the DB, that there is no available channel at present, the enabling STA or the dependent AP may not transmit the WSM any more. In this case, since the enabled dependent STAs do not receive the WSM for a given time period (for example, dot11WhiteSpaceMapValidTime), they are unenabled in the same manner as that the WSM is not valid.

B. Method for Transmitting Blank WSM which Does Not Include Available Channel Information According to another embodiment of the present invention, as a method for signaling that there is no available channel, a method for transmitting WSM information element format, which includes a length field indicating a length N=0 of a channel map, is suggested. In more detail, as described with reference to FIG. 3, if the WSM is transmitted, which is set to allow the length field indicating a length of WSM information value field to indicate a length N=0 of a channel map of the WSM information value field, the case where there is no additional channel map information update should be identified from the case where all the channels are not available. Hereinafter, unless otherwise mentioned, 'the WSM set to indicate the length N=0 of the channel map' indicates that the length field indicating the length of the WSM information value field indicates sum of the length of the device type field and the length of the map ID field, and also indicates that the length N of the channel map field is 0.

When signaling is performed for the case where all the channels are not available, it is preferable that signaling indicating that the map has been updated is additionally provided. In FIG. 3 and FIG. 4, the WSM, which is updated as compared with the map version that has previously transmitted the map version field, is transmitted, wherein signaling indicating that there is no available channel is performed in such a manner that the WSM of which channel map length is N=0 is transmitted. The dependent STAs which have received the WSM may switch their enabling state to the unenabled state by interpreting that there is no available channel. After transmitting the WSM, the enabling STAs should switch the state of the dependent STA enabled by themselves to the unenabled state. Likewise, after transmitting the WSM, the dependent AP switches its state to the unenabled state.

Hereinafter, the case where the WSM of which channel map length is N=0 is transmitted will be described depending on a channel map type field.

Case where Map Type is a Full Channel List

The case where a map type is a full channel list means that the list of all the available channels is transmitted at the time when the WSM is transmitted. Accordingly, when the updated list of available channels is acquired from the DB, if there is no available channel, the channel map of the WSM format described as above has no information.

For example, in the aforementioned case, it is considered that WSM having the following configurations is transmitted.

Type of map ID=1 (full channel list)
Version of map ID=(version of map ID+1) mod N (WSM update)
N=0

The AP/STA that has received the WSM having the aforementioned configurations recognizes that there is no white space, and it is suggested that the AP/STA is unenabled.

In other words, in a state that the map type of the WSM refers to the full channel list and the map is updated (MAP ID version is updated), if the WSM of which channel map length is N=0 is transmitted, the STA interprets that there is no available channel although updated channel information has been transmitted through DB access. In other words, the enabling STA which desires to perform signaling indicating that there is no available channel after DB access updates map ID version and transmits WSM of which channel map length is N=0 by using the map type field of the WSM as the full channel list. The enabling STA that has accessed the DB should stop transmission of all signals at the white space band because there is no available channel at the white space. In this case, a duration where signal transmission should be stopped may be defined separately. It is suggested that signal transmission at the white space within the duration should be stopped.

It is not to be understood that a link where the enabling STA transmits the WSM is essentially limited to the white space band. In other words, a signal may be transmitted to another ISM band, a public safety band, a cellular band, and a cable line in addition to the white space band. However, if the enabling STA transmits such a WSM, the enabling state of all the dependent STAs managed by the enabling STA should be switched to the unenabled state.

Likewise, the dependent AP that has transmitted the WSM should switch its enabling state to the unenabled state after transmitting the corresponding WSM.

The dependent STA that has received the WSM stops transmission of all the signals and switches the enabling state to the unenabled state because there is no available channel at the white space band. In this case, a duration where signal transmission should be stopped may be defined separately, and signal transmission at the white space within the duration should be stopped. If the dependent AP receives the WSM, it is not unenabled immediately, and may switch its enabling state to the unenabled state after transmitting the WSM to the STAs to which the corresponding dependent AP provides a service.

However, if database information is not updated even at the time when database access is newly performed after previous database access, according to one embodiment of the present invention, WSM of N=0 may be transmitted to reduce signaling overhead. If the WSM is used as above, it is suggested that the WSM is transmitted without update of the map version. In other words, if the WSM of which map version is not updated is transmitted, it indicates that the WSM is the same information as that on a previous list of available channels. The STA that has received the WSM may be operated at the available channel continuously, or may be operated by switching an operation channel to a random channel of the list of available channels.

However, in order to avoid confusion of the operation, it is preferable to limit WSM transmission of which map version is the same as a previous WSM transmission timing with N>0 at the previous WSM transmission timing and N=0 at a later WSM transmission timing.

Case where Map Type is a Partial Channel List

The case where a map type is a partial channel list means that all the available channels are not transmitted but partially transmitted for efficiency at the time when the WSM is transmitted. A signaling method for WSM having a channel map length of N=0 with signaling of a partial map may be interpreted as follows.

In other words, [1] interpretation that there is no change of the channel map may be made, whereby operation continues to be performed at the existing channel and the other channels determined to be used, or [2] interpretation that there is no available channel may be made, whereby the unenabled operation may be performed.

It is assumed that WSM having the following configurations is transmitted.

Type of map ID=0 (partial channel list)
Version of map ID=(version of map ID+1) mod N (WSM update)
N=0

If the WSM map type refers to a partial channel list and map ID version is updated, the STA interprets that the enabling STA has accessed the DB after receiving the WSM and the list of available channels has been updated.

Accordingly, even though the map ID version has been updated, if N=0, the STA interprets that there is no available channel. The dependent STA that has received the WSM stops transmission of all signals and switches the enabling state to the unenabled state because there is no available channel at the white space. In this case, a duration where signal transmission should be stopped may be defined separately, and signal transmission at the white space within the duration should be stopped.

When the enabling STA transmits the list of available channels, if there is no change in the channel information of the database, one embodiment of the present invention suggests a method for transmitting WSM of N=0 without updating the map version. In other words, if the enabling STA transmits the WSM of which map version is not updated while signaling a partial map, it indicates that the WSM is the same information as that on a previous list of available channels. The STA that has received the WSM may be operated at the available channel continuously, or may be operated by switching an operation channel to a random channel from the list of available channels.

C. Definition of New Map Type

In order to process an exceptional case such as the case where all the channels are not available, a new map type may be defined. For example, in the aforementioned WSM format, a map type field of 2 bits may be defined, and in addition to the map type=0 (full channel list), 1 (partial channel list), the following map type may be defined additionally.

map type=2 (no available channel)

In this case, the other fields except for the element ID and the map type are meaningless. The dependent STA that has received the WSM recognizes that there is no available channel at the white space band, stops transmission of all the signals, and switches the enabling state to the unenabled state. In this case, a duration where signal transmission should be stopped may be defined separately, and signal transmission at the white space within the duration should be stopped.

The aforementioned embodiments will be described with reference to the device type field of the WSM. As described above, if the enabling STA is a fixed type device, both VHF and UHF bands may be used. If the dependent STA is a personal/mobile device, the UHF band may only be used. Accordingly, if there is no available channel at the UHF band at a specific time, it is suggested that a blank WSM is transmitted to the dependent STA corresponding to the personal/mobile device. In other words, under the circumstances, the WSM, which includes available channel information, may still be transmitted to the fixed type device.

Accordingly, according to the embodiments of the present invention, it is suggested that the blank WSM is transmitted depending on the device type and the device type field value of the WSM may be varied at the time when the blank WSM is transmitted depending on the device type.

Figure 5:
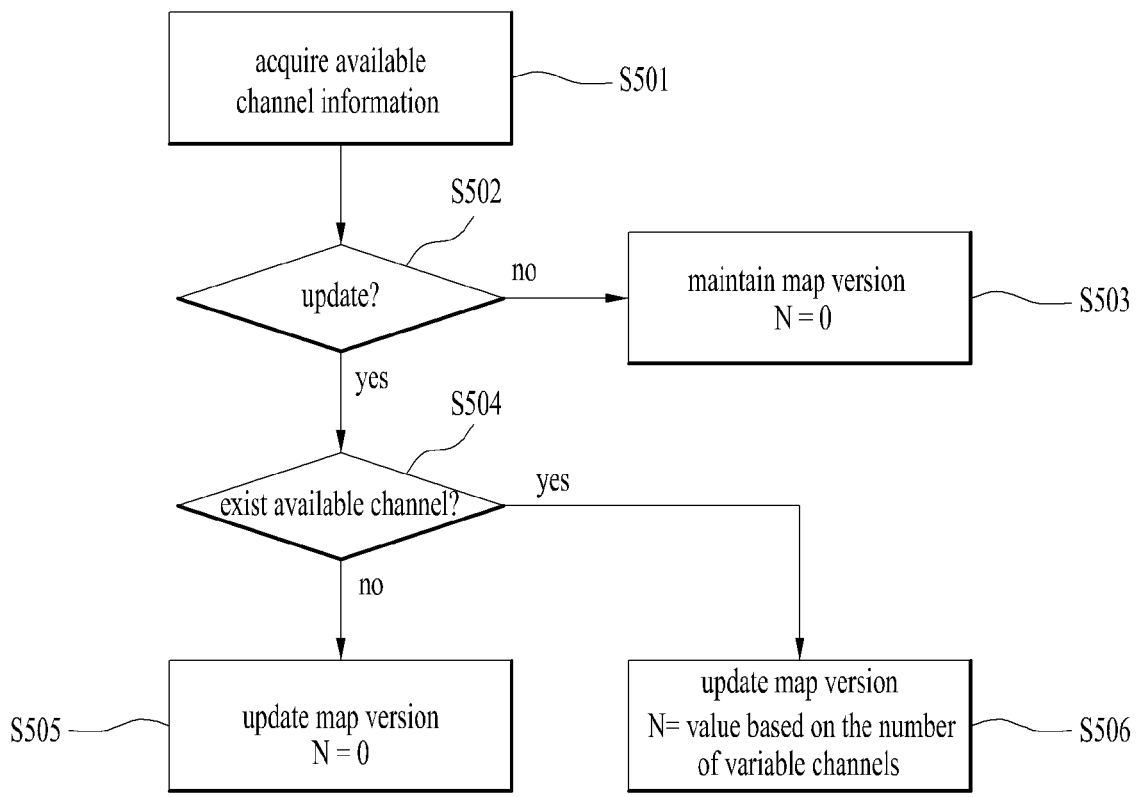
FIG. 5 is a diagram illustrating an example of transmission of blank WSM according to the embodiment of the present invention.

FIG. 5 is a diagram illustrating an example of transmission of blank WSM according to the embodiment of the present invention.

First of all, FIG. 5 is intended to describe signaling when there is no available channel after the enabling STA performs DB access. The operation of the dependent STA that has received the blank WSM may easily be determined by the person with ordinary skill in the art.

First of all, the STA which will provide available channel information may acquire available channel information by performing DB access (S501). Afterwards, the STA may determine whether the acquired available channel information has been updated (S502). If the acquired available channel information has not been updated, the STA may maintain the value of the map version and transmit the WSM of N=0 to reduce signaling overhead (S503). At this time, although the map type may not be important, it may preferably be set to a value indicating the partial channel list to avoid confusion.

If the acquired available channel information has been updated, the STA determines whether the available channel exists actually (S504). If the available channel exists, the STA may update the map version, set N to a value based on the number of available channels, and transmit the WSM, which includes actual available channel information (channel number, maximum allowable transmission power) to the channel map field. However, if there is no available channel, it is suggested that the STA updates the map version to indicate that the WSM is the updated WSM, and transmits the blank WSM of N=0. At this time, although the map type may not be important, it may preferably be set to a value indicating the full channel list to avoid confusion. In the aforementioned embodiments, the presence of the available channel may be set differently depending on the device type, and the WSM based on the available channel may be set to indicate the device type to which the corresponding WSM will be applied.

Figure 6:
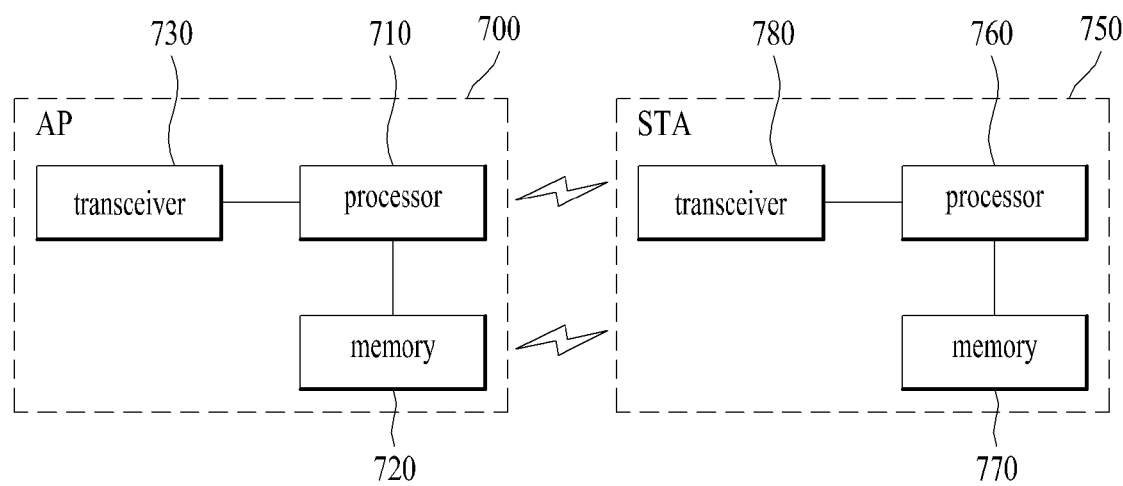
FIG. 6 is a brief diagram illustrating a device of STA (AP) according to one embodiment of the present invention.

FIG. 6 is a brief diagram illustrating a device of STA (AP) according to one embodiment of the present invention.

In FIG. 6, a device, which constitutes and transmits the WSM, is shown as an AP 700, and a device, which receives the AP 700, is shown as an STA 750. In this case, the AP 700 may be the enabling STA, or may be the dependent AP that receives the WSM from the enabling STA and forwards the received WSM to the dependent STA 750.

Each of the AP 700 and the STA 750 may include a transmitter 730, 780, a processor 710, 760, and a memory 720, 770 that is selectively provided. Although not shown in FIG. 6, the database and/or RLS in the WLAN system shown in FIG. 1 may have a similar structure.

The AP 700 or the STA 750 operated as the unlicensed device of which operation is allowed within the available channel which is not used by the licensed device at the white space band will be described with reference to FIG. 6. The AP 700 or the STA 750 may include a transceiver 730, 780, which may be operated at a plurality of frequency bands, and a processor 710, 760 functionally connected with the transceiver 730 and 780, processing the WSM if the transceiver 730, 780 receives the WSM.

In more detail, the transceiver 730 of the AP 700, which transmits the WSM, may acquire available channel information by accessing a database DB, which manages available channel information within the white space band, and may transmit the generated WSM to the STA 750 in accordance with the available channel information. Also, if the available channel information acquired from the DB indicates that there is no available channel within the white space band, the processor 710 may set map ID to indicate that the WSM is the updated WSM and set a length field to indicate that the length is 0.

Also, the STA 750 includes the transceiver 780 that receives the WSM. If the map ID indicates that the WSM is the updated WSM and the length field indicates a length of 0, the processor 760 may determine that the available channel information within the white space band indicates that there is no available channel, and may control the transceiver 780 to perform the WLAN operation.

Those skilled in the art will appreciate that the present invention may be carried out in other specific ways than those set forth herein without departing from the spirit and essential characteristics of the present invention. It is also obvious to those skilled in the art that claims that are not explicitly cited in each other in the appended claims may be presented in combination as an embodiment of the present invention or included as a new claim by a subsequent amendment after the application is filed. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

Industrial Applicability

Although the aforementioned embodiments of the present invention have been described based on the IEEE 802.11 system, they may equally be applied to various mobile communication systems in which an unlicensed device may be operated by acquiring available channel information.

The invention claimed is:

1. A method for a first station (STA) to transmit available channel information for a wireless local area network (WLAN) operation within a white space band, the method comprising:

acquiring the available channel information by accessing a database (DB) that manages the available channel information within the white space band; and transmitting a white space map (WSM) generated in accordance with the available channel information to a second STA, wherein the WSM includes a channel map field having a variable length, a length field indicating a length of the channel map field, and map ID information indicating a type of the WSM and indicating whether the WSM has been updated, and if the available channel information acquired from the DB indicates that there is no available channel within the white space band, the first STA transmits the WSM which is set as the map ID to indicate that the WSM is the updated WSM and the length field to indicate that the length of the channel map field is 0.

2. The method according to claim 1, wherein the map ID field includes a map type field indicating that the WSM indicates partial available channel information or full available channel information, and a map version field indicating whether the WSM has been updated.

3. The method according to claim 2, wherein, if the available channel information acquired from the DB indicates that there is no available channel within the white space band, the first STA increases a value of the map version as much as 1 on the basis of modulo operation within the range of a predetermined integer, and transmits WSM which is set to allow the length field to indicate that the length of the channel map field is 0.

4. The method according to claim 2, wherein, if the available channel information acquired from the DB is not changed from available channel information acquired during previous access, the first STA maintains the value of the map version, and transmits WSM which is set to allow the length field to indicate that the length of the channel map field is 0.

5. The method according to claim 4, wherein, if the available channel information acquired from the DB is not changed from available channel information acquired during previous access, the first STA transmits WSM which is set to allow the map type field to indicate that the WSM indicates full available channel information.

6. A method for a second station (STA) to receive available channel information for a wireless local area network (WLAN) operation within a white space band from a first station, the method comprising:

receiving a white space map (WSM) generated in accordance with the available channel information within the white space band from the first STA; and performing WLAN operation in accordance with the received WSM, wherein the WSM includes a channel map field having a variable length, a length field indicating a length of the channel map field, and map ID information indicating a type of the WSM and indicating whether the WSM has been updated, and if the map ID indicates that the WSM is the updated WSM and the length field indicates that the length of the channel map field is 0, the second STA determines that the available channel information within the white space band indicates that there is no available channel within the white space band, and performs the WLAN operation.

7. The method according to claim 6, wherein the map ID field includes a map type field indicating that the WSM indicates partial available channel information or full available channel information, and a map version field indicating whether the WSM has been updated.

8. The method according to claim 7, wherein, if the value of the map version is increased as much as 1 on the basis of modulo operation within the range of a predetermined integer and WSM indicating that the length field is 0 is received, the second STA determines that there is no available channel within the white space band, and performs the WLAN operation.

9. The method according to claim 7, wherein, if the value of the map version is not changed and WSM indicating that the length of the channel map field is 0 is received, the second STA determines that there is no change in the available channel within the white space band, and performs the WLAN operation.

10. The method according to claim 7, wherein the second STA is a dependent AP, further comprising the steps of transmitting the received WSM to a third STA that receives a service from the dependent AP, if the dependent AP determines that the received WSM indicates that there is no available channel within the white space band, and changing a state of the dependent AP to an unenabled state.

11. A first station for transmitting available channel information for a wireless local area network (WLAN) operation within a white space band, the first station comprising:

a transceiver acquiring the available channel information by accessing a database (DB) that manages the available channel information within the white space band, and transmitting a white space map (WSM) generated in accordance with the available channel information to a second STA; and a processor connected with the transceiver, generating the WSM in accordance with the available channel information acquired by the transceiver, wherein the WSM includes a channel map field having a variable length, a length field indicating a length of the channel map field, and map ID information indicating a type of the WSM and indicating whether the WSM has been updated, and if the available channel information acquired from the DB indicates that there is no available channel within the white space band, the processor sets the map ID to indicate that the WSM is the updated WSM and sets the length field to indicate that the length of the channel map field is 0.

12. A second station for receiving available channel information for a wireless local area network (WLAN) operation within a white space band from a first station, the second station comprising:

a transceiver receiving white space map (WSM) generated in accordance with the available channel information within the white space band from the first STA; and a processor connected with the transceiver, controlling the transceiver to perform the WLAN operation in accordance with the received WSM, wherein the WSM includes a channel map field having a variable length, a length field indicating a length of the channel map field, and map ID information indicating a type of the WSM and indicating whether the WSM has been updated, and if the map ID indicates that the WSM is the updated WSM and the length field indicates that the length of the channel map field is 0, the processor determines that the available channel information within the white space band indicates that there is no available channel within the white space band, and controls the transceiver to perform the WLAN operation.

* * * * *